United States Patent Office 3,335,121
Patented Aug. 8, 1967

3,335,121
POLYMERIZATION PROCESS
Giulio Natta, Adolfo Zambelli, and Italo Pasquon, Milan, Italy, assignors to Montecatini Edison S.p.A., Milan, Italy
No Drawing. Filed July 3, 1963, Ser. No. 292,773
6 Claims. (Cl. 260—93.7)

This invention relates to a process for preparing polypropylene having a crystallinity due substantially exclusively to syndiotactic structure, by the polymerization of propylene in contact with a homogeneous catalyst prepared from vanadium triacetylacetonate and organometallic aluminum halides.

The term "syndiotactic structure" as defined by Giulio Natta, and in the art following Natta, indicates a regular head-to-tail structure wherein monomeric units with enantiomorphic carbon atoms regularly follow one another alternately.

In our parent application Ser. No. 238,862 filed Nov. 20, 1962, now U.S. Patent No. 3,305,538, we disclosed a method for preparing polypropylene having a crystallinity due substantially exclusively to syndiotactic structure by polymerizing propylene in contact with the following two classes of catalysts:

(a) Catalysts obtained from vanadium triacetylacetonate and an aluminum compound of the formula $AlRX_2$ or $Al_2R_3X_3$, wherein R is a hydrocarbon radical and X is halogen, a Lewis base being preferably used when the catalyst-forming components are vanadium triacetylacetonate and $AlRX_2$;

(b) Catalysts obtained from a vanadium halide, particularly from $VCl_4$, and an aluminum compound having the formula $AlR'R''X$ or $Al_2R'_3X_3$ in which R' and R" are hydrocarbon radicals and X is halogen; a Lewis base, preferably a weak Lewis base, is also useful with these catalyst systems and, also, it has been found that particularly good results in the polymerization of propylene with these catalysts based on vanadium halides such as $VCl_4$, and $AlR'R''X$, when pure solvents are used as the liquid diluent for the catalyst preparation and the propylene polymerization.

According to the present invention it has been found that when vanadium triacetylacetone is mixed with an organometallic aluminum monohalide, at temperatures below 0° C., in an aromatic hydrocarbon solvent, and in a molar ratio not greater than 1:5, a reaction product is formed which is soluble in the aromatic hydrocarbon solvent and which is a homogeneous catalyst for the polymerization of propylene to a crude (total) polypropylene showing, on X-rays examination, crystallinity due only to syndiotactic enchainment of the propylene units.

When the catalyst-forming components are used in a molar ratio of 5, it is advantageous to prepare the catalyst in the presence of a weak Lewis base, i.e., a Lewis base which has a heat of complexation with the organometallic aluminum halide lower than 12,000 cal. per mol of the organometallic aluminum halide.

The organometallic aluminum halides useful in preparing the catalyst have the formula $AlR'R''X$, in which R' and R" are alkyl, aryl, alkylaryl or cycloalkyl groups containing up to 10 carbon atoms, and X is a halogen atom, preferably a chlorine atom.

Specific preferred organometallic aluminum monohalides include diethyl aluminum monochloride, diisobutyl aluminum monochloride, diphenyl aluminum monochloride, etc.

The useful Lewis bases include anisole, diisopropylether, diisobutylether, diphenylsulfide, diphenylether, thiophene, N,N-diethylaniline and benzophenone.

The molar ratio of the Lewis base to vanadium triacetylacetonate can vary from 0.5 to 2. Preferably, a 1:1 molar ratio is used.

Aromatic hydrocarbons which are solvents for the reaction product formed by mixing the vanadium triacetylacetonate and organometallic aluminum monohalide in the molar ratio not greater than 1:5 at the temperature below 0° C., and which can be used in preparing the catalyst and as the liquid medium in which the propylene is polymerized with the homogeneous catalyst, include toluene, 1,3-dimethylbenzene and similar aromatic hydrocarbons which have a melting point at below 0° C., preferably at below —30° C.

In the case of these homogeneous hydrocarbons-soluble catalyst, the upper limit of 5:1 on the molar ratio of the organometallic aluminum monohalide to vanadium triacetylacetonate is critical to the production of the crystalline polypropylene showing crystallinity due substantially only to the existence therein of the stereoregular structure syndiotactic, since at ratios higher than 5, the polypropylene obtained is completely amorphous. To insure production of the crystalline polypropylene both the catalyst preparation and the polymerization are carried out at temperatures below 0° C., and preferably at temperatures between —30° C. and —100° C.

The polypropylenes obtained by polymerizing propylene according to this invention show, when subjected to infra-red examination, the characteristic absorption bands of polypropylene having syndoiotactic structure. The characteristic bands of the ternary isotactic spirals are absent from the infra-red spectra. More specifically, in addition to the characteristic absorption bands at 11.53 microns, the infra-red spectra show other characteristic bands at 7.62; 7.91; 9.95 and 12.30 microns.

The polypropylenes give an X-ray diffraction pattern showing the presence of several lines characteristic of the syndiotactic structure, more particularly the lines corresponding to lattice distances of about 7.15 A. (medium high intensity), 5.3 A. (high intensity) and 4.3 A. (high intensity). The line corresponding to the lattice distance of 6.3 A., which is characteristic of polypropylene having the different stereoregular structure isotactic, is absent.

The index of crystallinity due to the existence of syndiotactic structure in the crude polypropylene can be calculated from the so-called infra-red crystallinity index or "IR crystallinity index" which is arbitrarily defined by the following ratio:

$$\frac{A_{11.53} \times 100}{(A_{2.32} + A_{2.35})/2}$$

in which $A_{11.53}$ is the absorption read on a base line drawn on the two near windows at about 11.4 and 11.7 microns; and $A_{2.32}$ and $A_{2.35}$ are the absorptions of two near bands taken as reference, since their intensity is almost independent of the structure and physical state of the polypropylene.

It has been found, in practice, that the polypropylene obtained according to this invention have an IR crystallinity index (for syndiotactic structure) which is higher than or at least equal to 80 and higher than the crystallinity index of syndiotactic polypyropylene obtained with the aid of heterogeneous catalysts.

The polypropylenes obtained as disclosed herein can be used as thermoplastic materials, especially in applications where a high elasticity is desired or required, and can also be used for the production of fibers and films possessing a high elasticity and high tensile strength.

Similarly to atactic (amorphous) polypropylene and atactic ethylene/propylene copolymers, these polypropylenes can be vulcanized by the methods and using the recipes conventionally employed for the vulcanization of natural and synthetic rubber. The elastomers obtained have mechanical properties which are superior to those of unsaturated rubbers and of elastomers obtained from polyisobutylene.

The following examples are given to illustrate the present invention and are not intended to limit the scope thereof:

*Example 1*

Into a glass reactor, kept at a constant temperature of −78° C., the following substances are introduced in the following order:

| | | |
|---|---|---|
| Toluene | cc | 100 |
| Vanadium triacetylacetonate | mols | $10^{-3}$ |
| Aluminum diethylmonochloride | do | $5.10^{-3}$ |
| Propylene | g | 80 |

After 24 hours, during which time the temperature is kept at −78° C., the content of the reactor is coagulated with methanol thus obtaining 2 g. of polypropylene having an intrinsic viscosity of 0.5 and an IR crystallinity index of 80.

*Example 2*

By operating as described in Example 1, but using $10 \times 10^{-3}$ mols of aluminum diethylmonochloride, 13 g. of a completely amorphous polypropylene (IR=0) are obtained.

*Example 3*

By operating as described in Example 1 in the presence of $10^{-3}$ mols of anisole, 0.35 g. of a polypropylene having an intrinsic viscosity of 0.19 and an IR index of 236 are obtained.

*Example 4*

Into a glass reactor, kept at a constant temperature of −78° C., the following substances are introduced in the following order:

| | | |
|---|---|---|
| Toluene | cc | 100 |
| Vanadium triacetylacetonate | mols | $10^{-3}$ |
| Aluminum diethylmonochloride | do | $4.10^{-3}$ |
| Polypropylene | g | 80 |

After 24 hours, during which time the temperature is kept at −78° C., the content of the reactor is coagulated with methanol thus obtaining 2 g. of polypropylene having an intrinsic viscosity of 0.19 and an IR crystallinity index of 150.

The intrinsic viscosities given in the examples were determined in tetrahydronaphthalene at 135° C.

Various modifications and changes can be made in practicing this invention without departing from the spirit thereof. Therefore, it is intended to include in the scope of the appended claims all such modifications and variations as will be apparent from the description and illustrative examples given herein.

This application is a continuation-in-part of our application Ser. No. 238,862 filed Nov. 20, 1962, now U.S. Pat. No. 3,305,538.

What is claimed is:

1. A process for preparing polypropylene showing crystallinity due substantially only to the existence of the stereoregular structure syndiotactic in the macromolecules thereof, which process comprises polymerizing propylene, at a temperature below 0° C., in an inert aromatic hydrocarbon solvent, and in contact with a homogeneous catalyst which is the aromatic hydrocarbon-soluble product of the reaction, at a temperature below 0° C., of vanadium triacetylacetonate, an organometallic aluminum monohalide of the formula AlR′R″X in which R′ and R″ are selected from the group consisting of alkyl, aryl, alkylaryl, and cycloalkyl groups containing up to 10 carbon atoms and X is a halogen atom, in a molar ratio of the vanadium triacetylacetonate to organometallic aluminum monohalide of 1:5, and of a Lewis base having a heat of complexation with the organometallic aluminum halide lower than 12,000 cal. per mole of said halide.

2. The process according to claim 1, characterized in that both the propylene polymerization and preparation of a homogeneous catalyst are carried out at a temperature between −30° C. and −100° C.

3. The process according to claim 1, characterized in that the organometallic aluminum ha ildeis diethyl aluminum monochloride.

4. The process according to claim 1, characterized in that the organometallic aluminum halide is diethyl aluminum monochloride.

5. The process according to claim 4, further characterized in that the homogeneous catalyst is prepared by mixing the catalyst-forming components in toluene, and the propylene is polymerized in contact therewith in the same solvent.

6. The process according to claim 1, characterized in that the molar ratio of the Lewis base to vanadium triacetylacetonate is from 0.5 to 2.

References Cited

UNITED STATES PATENTS 3,258,455  6/1966  G. Natta et al. _____ 260—93.7

JOSEPH L. SCHOFER, *Primary Examiner.*

L. EDELMAN, *Assistant Examiner.*